Figure 1:
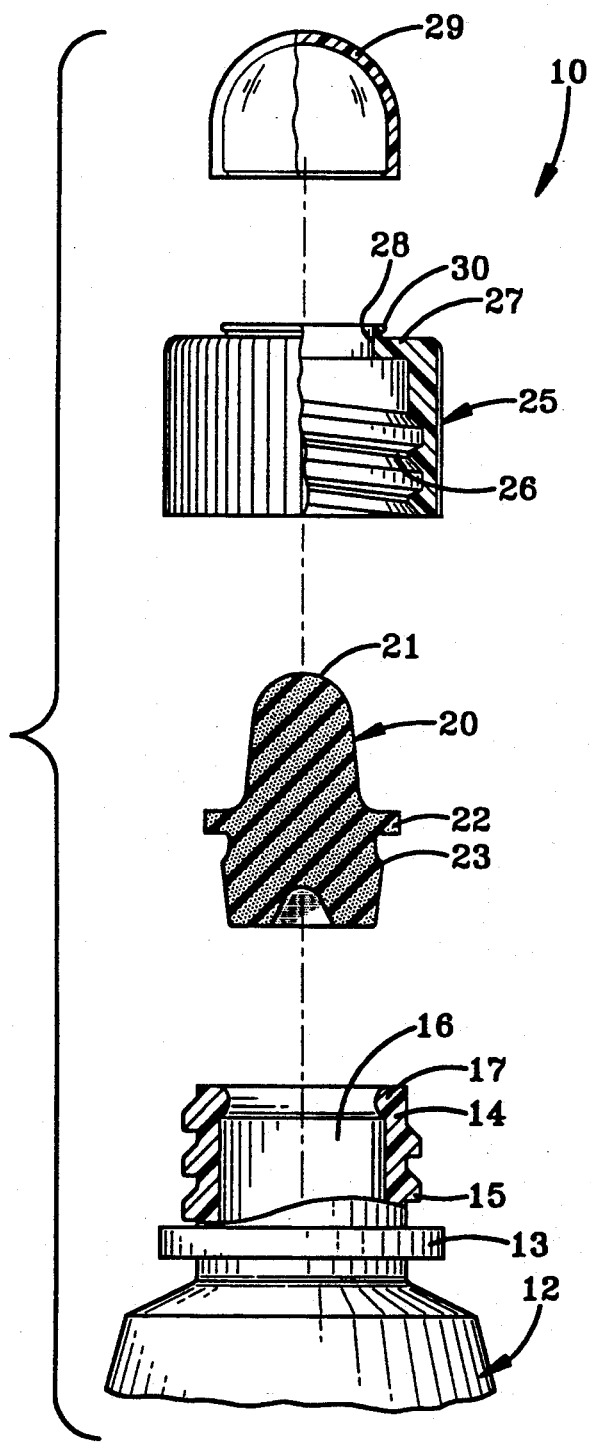

United States Patent [19]
Sibley

[11] Patent Number: 5,197,815
[45] Date of Patent: Mar. 30, 1993

[54] CONTACT LENS CLEANING SYSTEM
[75] Inventor: Murray J. Sibley, Westerville, Ohio
[73] Assignee: Abbott Laboratories, Abbott Park, Ill.
[21] Appl. No.: 767,610
[22] Filed: Sep. 30, 1991

Related U.S. Application Data

[63] Continuation-in-part of Ser. No. 637,586, Jan. 4, 1991, abandoned.

[51] Int. Cl.$^5$ .............................................. G02C 13/00
[52] U.S. Cl. ................................... 401/202; 401/183; 401/207; 15/214
[58] Field of Search ...................... 401/207, 183, 202; 15/214

[56] References Cited

U.S. PATENT DOCUMENTS

| 211,104 | 1/1879 | Mulford | 401/183 |
| 973,375 | 10/1910 | Molloy | 401/183 |
| 2,227,710 | 1/1941 | Finn | 15/214 X |
| 2,453,201 | 11/1948 | Cushman | 401/207 |
| 2,648,085 | 8/1953 | Rodgers | 401/207 X |
| 2,924,837 | 2/1960 | Lehre | 401/207 |
| 2,947,015 | 8/1960 | Burt | 401/183 |
| 4,389,132 | 6/1983 | Valadez | 401/202 X |
| 4,887,994 | 12/1989 | Bedford | 604/1 |

FOREIGN PATENT DOCUMENTS 460289 11/1950 Italy ................................. 401/202

Primary Examiner—Steven A. Bratlie
Attorney, Agent, or Firm—Lonnie R. Drayer; Donald O. Nickey

[57] ABSTRACT

A contact lens cleaning system has a soft tip applicator affixed to a container of lens cleaning solution and is used to apply the solution to the lenses. A supply of sterile replacement soft tip applicators are provided as a part of the system.

2 Claims, 1 Drawing Sheet

CONTACT LENS CLEANING SYSTEM

This application is a continuation-in-part of application Ser. No. 07/637,586 filed on Jan. 4, 1991, now abandoned.

This invention relates to a system for cleaning contact lenses.

BACKGROUND OF THE INVENTION

Many people currently utilize soft contact lenses. These lenses must be cleaned regularly to avoid eye irritation and bacterial contamination. Present methods of cleaning contact lenses have a variety of disadvantages. For example, lenses are often cleaned by rubbing them against the skin of the user's hand or by means of a hand-held cloth. This can damage or scratch the lens and may also result in additional buildup of oil on the lens due to the natural oiliness of the skin.

It is necessary that all contact lens cleaning solutions be sterile, therefore all containers for these solutions must be sterilizable and designed in such a way that will provide a sterile environment for the contact lens cleaning solution. Improper cleaning can also result in corneal infection.

Accordingly, the present invention relates to a contact lens cleaning system that overcomes the above mentioned disadvantages of the prior art lens cleaning techniques.

A contact lens cleaning system in accordance with the present invention comprises a container and a supply of replacement applicator tips, the container is sterilizable and is suitable for holding contact lens cleaning solution; a porous, soft tip applicator having a protruding upper surface and a shoulder that is adapted to engage the upper surface of the container; and a cap that is adapted to be fastened to the container, said cap having an opening through which the protruding upper surface of the applicator tip can pass.

More particularly, the present invention is directed to a contact lens cleaning system which utilizes an easily replaceable soft-tip applicator, which can be secured to the top of a bottle of contact lens cleaning solution. The easily replaceable soft-tip applicator may be used to apply lens cleaning solution to clean a contact lens of foreign substances which can cause infections or abrasions to the eye. The applicator can be discarded after use and the bottle of lens cleaning solution capped and used again. Alternatively, the bottle can be capped with the applicator in place. Preferably the soft tip applicator is replaced between uses of the contact lens cleaning system.

Figure 2:
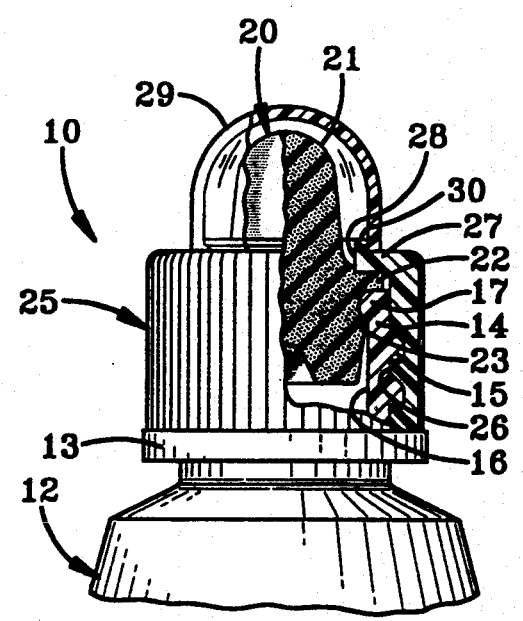

FIG. 1 is an exploded side-plan view, partially in broken section, of an embodiment of the present invention; and FIG. 2 is a simplified side-plan view, partially in broken section, of the embodiment of FIG. 1.

Referring to the drawings, FIG. 1 is an exploded side-plan view of an embodiment of the device 10 of the present invention and FIG. 2 is a simplified side-plan view of the embodiment of FIG. 1.

The device 10 includes a bottle or other container 12 having a shoulder 13 and a neck 14 which has external threads 15, an opening 16 and a lip 17.

An easily replaceable disposable soft-tip applicator 20 has a generally curved upper surface 21 that is in the general shape which is complementary to the inner surface of a contact lens. The applicator 20 has a flange 22 that is adapted to engage the upper surface of lip 17. The applicator also has a lower portion 23 with a slightly enlarged outside diameter which is engaged by the inner surface of lip 17.

A cap 25 which has internal threads 26 that are adapted to engage the external threads 15 of the bottle 12, is also provided. The cap has an upper shoulder 27 that is adapted to engage flange 22 of the applicator 20 and an opening 28 through which the curved upper surface 21 of applicator 20 protrudes when the cap 25 is fastened to the bottle 12. A dust cover 29 is detachably affixed to the cap 25 by any suitable means for attachment such as a snap-fit onto or ring 30 on the cap.

The bottle 12 may be constructed of any suitable material such as plastic or glass, that is squeezable, durable, inert to the lens cleaning solution and is compatible to sterilization by means of a gas such as a blend of ethylene oxide and carbon dioxide, or by subjecting the container to radiation. The cap 25 and dust cover 29 may be constructed of plastic or metal. The soft tip applicator 20 should be constructed of a porous material such as a cellulose or synthetic sponge. Preferably, the applicator comprises a relatively soft polymeric material which has been made porous by infiltrating it with a suitable gas during the polymerization process. A suitable material for the applicator tip should be very slightly abrasive with respect to the contact lens material. Conventional lens cleaning solutions may be used in the device of this invention. Preferably the lens cleaning solution contains a preservative such as benzalkonium chloride, sorbic acid, or thimerosal which maintains the solution in a sterile state.

Means other than threads, as for example a snap-fit, may be used to fasten the cap 25 to the bottle 12.

In use, the bottle is inverted to moisten the applicator tip and clean the lens. It is understood that an additional step in the lens cleaning process would be to immerse the lens in a suitable antiseptic solution after the device of the present invention has been used. The applicator tip may be discarded after each use and the bottle sealed with a lid or a dust cover 29 which is sized to fit over the tip may be used if it is desired to reuse the tip.

The present invention provides a contact lens cleaning system employing an easily replaceable soft tip applicator which is attached to a bottle of contact lens cleaning solution and provides for the facile and efficient cleaning of contact lenses. Users of contact lenses and the contact lens industry have a need for a device as described and claimed herein.

The invention has been described in detail with particular reference to certain preferred embodiments thereof, but it should be understood that variations and modifications can be effected within the spirit and scope of the invention.

What is claimed is:

1. A contact lens cleaning system comprising: (a) a squeezable container which is suitable for containing contact lens cleaning solution and has an opening through an upper surface thereof; a first replaceable porous, soft tip applicator having a protruding upper surface which is shaped complementary to the inner surface of a contact lens and a flange that is engaging the upper surface of the container; a cap that is releasably fastened to the container, the flange of the applicator being interposed between the cap and the upper surface of the container, said cap having an opening through which the protruding upper surface of the replaceable applicator extends; and a dust cover which is removably attached to the cap and encloses the applicator and is spaced apart therefrom; and (b) at least one additional sterile applicator that is substantially identical to said first applicator.

2. A contact lens cleaning system as described in claim 1 wherein the cap is fastened to the container by means of threads.

* * * * *